US010598145B2

United States Patent
Alloin et al.

(10) Patent No.: US 10,598,145 B2
(45) Date of Patent: Mar. 24, 2020

(54) METHOD FOR DETERMINING THE OPERATING POINT OF A HYDRAULIC MACHINE AND INSTALLATION FOR CONVERTING HYDRAULIC ENERGY

(71) Applicant: ALSTOM Renewable Technologies, Grenoble (FR)

(72) Inventors: Quentin Alloin, Grenoble (FR); Nicolas Perrissin-Fabert, Grenoble (FR); Renaud Guillaume, Grenoble (FR)

(73) Assignee: GE Renewable Technologies, Grenoble (FR)

( * ) Notice: Subject to any disclaimer, the term of this patent is extended or adjusted under 35 U.S.C. 154(b) by 285 days.

(21) Appl. No.: 15/511,351

(22) PCT Filed: Aug. 18, 2015

(86) PCT No.: PCT/EP2015/068927
§ 371 (c)(1),
(2) Date: Mar. 15, 2017

(87) PCT Pub. No.: WO2016/041719
PCT Pub. Date: Mar. 24, 2016

(65) Prior Publication Data
US 2017/0254313 A1    Sep. 7, 2017

(30) Foreign Application Priority Data

Sep. 15, 2014  (EP) ..................................... 14290276

(51) Int. Cl.
*F03B 3/18*     (2006.01)
*F03B 3/02*     (2006.01)
(Continued)

(52) U.S. Cl.
CPC ................ *F03B 3/183* (2013.01); *F03B 3/02* (2013.01); *F03B 15/06* (2013.01); *G01B 21/00* (2013.01);
(Continued)

(58) Field of Classification Search
CPC .. F03B 3/183; F03B 3/02; F03B 15/06; F03B 15/14; F03B 15/08; F03B 15/16; G01B 21/00; F05B 2220/32
See application file for complete search history.

(56) References Cited

U.S. PATENT DOCUMENTS

| 6,152,684 A * | 11/2000 | Ferme ..................... F03B 11/04 415/1 |
| 2014/0205428 A1* | 7/2014 | Brausewetter ............ F03B 3/06 415/1 |

FOREIGN PATENT DOCUMENTS

| CN | 1334902 A | 2/2002 |
| CN | 1379175 A | 11/2002 |

(Continued)

OTHER PUBLICATIONS

Machine Translation and First Office Action and Search issued in connection with corresponding CN Application No. 201580049434.3 dated Jun. 4, 2018.
(Continued)

*Primary Examiner* — Syed O Hasan
(74) *Attorney, Agent, or Firm* — Dority & Manning, P.A.

(57) ABSTRACT

This method allows determining the operating point of a hydraulic machine in a considered operating range, such as turbine mode, and comprises steps that consist in a) determining two coordinates (N'11, T'11) of a first series of potential operating points of the hydraulic machine for the orientation affected to guide vanes of the machine, b) measuring the rotation speed of the machine, and c) determining the torque exerted by water flow on the machine. The
(Continued)

method further includes steps consisting in d) calculating two coordinates (N11, T11) of a second series of potential operating points of the machine in function of the rotation speed (N) measured at step b) and the torque determined at step c), and e) deducing the two coordinates (N11_real, T11_real) of operating point that belongs both to the first and the second series in the said considered operating range of the machine.

11 Claims, 2 Drawing Sheets

(51) Int. Cl.
  *F03B 15/06*  (2006.01)
  *G01B 21/00*  (2006.01)
(52) U.S. Cl.
  CPC ....... *F05B 2220/32* (2013.01); *F05B 2270/20* (2013.01)

(56) References Cited

FOREIGN PATENT DOCUMENTS

| | | |
|---|---|---|
| CN | 101539088 A | 9/2009 |
| CN | 102713158 A | 10/2012 |
| CN | 103670887 A | 3/2014 |
| DE | 19860617 C1 | 10/2000 |
| EP | 303170 A2 | 2/1989 |
| EP | 0303170 A2 | 2/1989 |
| EP | 739087 A2 | 10/1996 |
| EP | 0739087 A2 | 10/1996 |
| EP | 1138941 A2 | 10/2001 |
| JP | 5314441 B2 | 10/2013 |
| RU | 2012124101 A | 12/2013 |

OTHER PUBLICATIONS

First Office Action and Search report in connection with corresponding RU Application No. 2017107718 dated Jan. 24, 2019.
International Search Report issued in connection with corresponding Application No. PCT/EP2015/068927 dated Dec. 12, 2015.

\* cited by examiner

METHOD FOR DETERMINING THE OPERATING POINT OF A HYDRAULIC MACHINE AND INSTALLATION FOR CONVERTING HYDRAULIC ENERGY

BACKGROUND

The invention relates to a method for determining the operating point of a hydraulic machine that belongs to an installation for converting hydraulic energy into mechanical or electrical energy. The invention also concerns an installation for converting hydraulic energy into mechanical or electrical energy on which the method can be implemented.

BRIEF DESCRIPTION

In the field of hydraulic energy conversion, it is important to know the operating point of a hydraulic machine. To this end, some physical values, such as the flow rate or the net head of the installation, are needed. The problem is that these physical values are not properly measurable.

Indeed, even if the net head and the flow rate measurements are possible in some cases, they are not accurate and are difficult to set up.

Moreover, direct flow rate measurement on large hydroelectric power plants doesn't exist. Indirect methods are used to determine the needed physical values. One of these methods is the Winter-Kennedy method, which is often used to perform in-site efficiency measurement. However, this method cannot be used under low waterfall conditions. Besides, Winter-Kennedy method relies on pressure sensors connected to the hydraulic passage by means of derivative small pipes. These pipes can be closed by dust, rust or sand in operating conditions, which impacts the measures accuracy.

The invention intends to solve this drawback by proposing a method for determining the operating point of a hydraulic machine that is more reliable and that can be implemented under low waterfall conditions.

To this end, the invention concerns a method as defined in claim 1.

An advantageous to embodiments of the invention may be that it is possible to determine the net head and the flow rate of the hydraulic machine by finding its operating point. The operating point results from an algorithm calculation compiled by an electronic control unit, which means that the installation does not include any measurement device linked to the water flow. Therefore, net head and flow rate calculations are accurate for "clean" water, as well as for "dirty" water, that is water containing impurities, such as dust or sand.

BRIEF DESCRIPTION OF THE DRAWINGS

Embodiments of the invention will now be explained in correspondence with the figures, and as an illustrative example, without restricting the object of the invention. In the figures.

DETAILED DESCRIPTION

Figure 1:
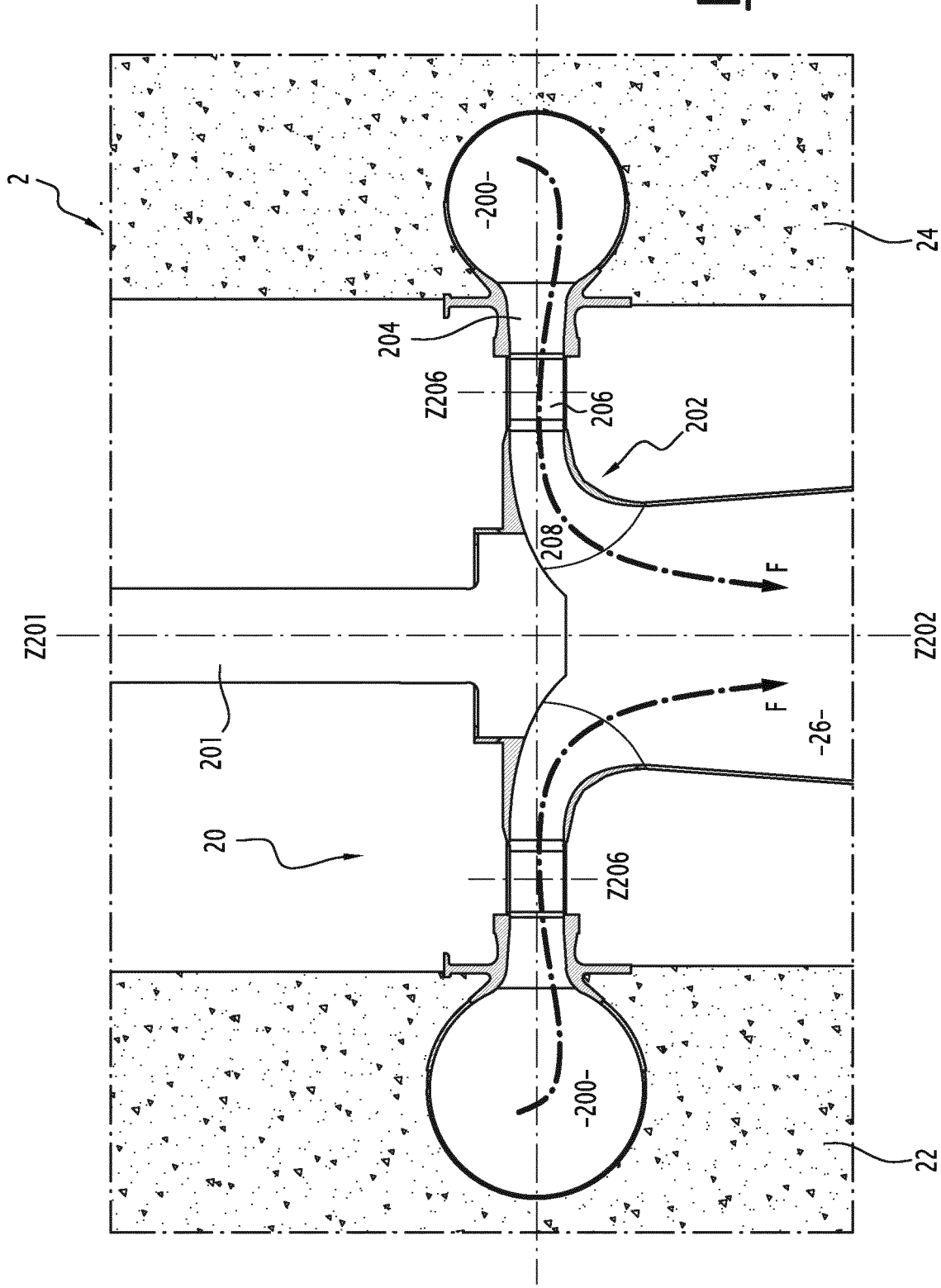
FIG. 1 is a schematic section of an installation for converting hydraulic energy into electrical energy or mechanical energy according to an embodiment of the invention.

FIG. 1 depicts an embodiment of an installation 2 for converting hydraulic energy into mechanical or electrical energy. The installation 2 includes a hydraulic machine. In the example, this hydraulic machine is a Francis turbine 20 that uses hydraulic energy to set a shaft 201 in rotation around an axis Z201. In the considered example, the shaft 201 is secured to a non-represented rotor of an alternator to produce electricity.

The turbine 20 includes a volute 200 that is supported by concrete blocks 22 and 24. A non-represented penstock extends between a non-represented upstream reservoir and the volute 200. This penstock generates a forced water flow F to power the turbine 20. The turbine 20 includes a runner 202 that is surrounded by the volute 200 and that includes blades 208 between which water flows in operating conditions. As a result, the runner 202 rotates around an axis Z202 that is superimposed with the rotation axis Z201.

A distributor is arranged around the runner 202. It includes a plurality of movable guide vanes 206 that are evenly distributed around the runner 202. A pre-distributor is disposed upstream of and around the distributor. The pre-distributor is formed by a plurality of fixed vanes 204 evenly distributed around the axis of rotation Z202 of the runner 202.

A suction pipe 26 is disposed below the runner 202 and is adapted to evacuate water downstream.

The guide vanes 206 of the distributor have each an adjustable pitch around an axis Z206 parallel to the axis of rotation Z202 of the runner 202. Consequently, they may be swiveled around axis Z206 to regulate the water flow rate. The guide vanes 206 are all oriented with the same angle relative to a closed position. In other words, they are synchronized. The guide vanes opening, that is the degree of openness of the guide vanes relative to their closed position, is known as it is a parameter that is controlled.

The hillchart of a turbine is a collection of operating points that are each defined by a quadruplet of values N11, T11, Q11, Y wherein Y is the opening of the guide vanes 206. At a given Y=Y_real, an "iso-opening" curve can be extracted from the hillchart. To facilitate the understanding, the triplets of values N'11, T'11, Q'11 refer to the whole collection of operating points of an iso-opening curve. The triplets of values N'11, T'11, Q'11 form a first series of potential operating points.

Figure 2:
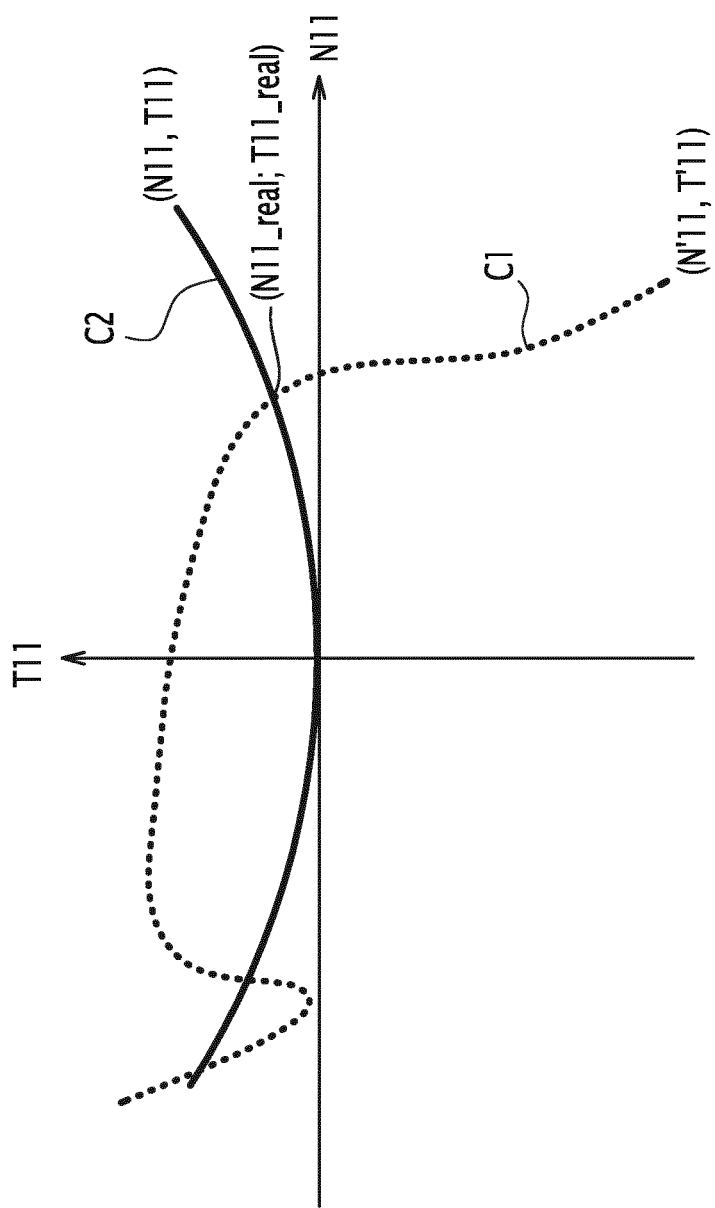
FIG. 2 is a graph illustrating two series of potential operating points of a hydraulic machine belonging to the installation of FIG. 1.

FIG. 2 shows an iso-opening curve example C1. As depicted, the operating points are plotted only depending on their coordinate along N11 axis and on their coordinate along T11 axis. The iso-opening curve is plotted in dotted line. One knows that at a given guide vanes opening, the operating point of turbine 20 is on the iso-opening curve C1. The series of operating points N'11, T'11, Q'11 is updated if, for any reason, the guide vanes opening changes.

Here-below, one explains a method for determining the operating point of turbine 20. The operating point of turbine 20 is a point having the coordinates N11_real, T11_real, Q11_real.

As depicted in FIG. 2, the upper right quadrant corresponds to a turbine mode, wherein it is needed to determine the operating point of the machine. Turbine mode corresponds to the quadrant wherein N11 and T11 are both positive.

By definition, T11, N11 and Q11 are characteristics parameters of the hydraulic machine 20. They are given by the following equations:

$$T11 = \frac{T}{D^3 * H} \quad \text{(Equation 1)}$$

$$N11 = \frac{N*D}{\sqrt{H}} \quad \text{(Equation 2)}$$

$$Q11 = \frac{Q*D^2}{\sqrt{H}} \quad \text{(Equation 3)}$$

wherein T is the torque exerted by water flow F on the runner 202, N is the rotation speed of the turbine 20, D is the diameter of runner 202, H is the net head of the installation 2 and Q is the flow rate of the installation 2.

Based on the above equations, T11 can be expressed in function of N11, as presented in the following equation:

$$T11 = \frac{T}{D^5 * N^2} N11^2 \quad \text{(Equation 4)}$$

The rotation speed N of the turbine 20 can be determined by measuring the frequency of the alternator coupled to the shaft 201. The torque T exerted by water flow F on the machine 20 can be calculated on the basis of the dynamic momentum equation applied to the shaft 201 of the machine 20. This equation is detailed below:

$$\frac{\pi}{30} * J * \frac{dN}{dt} = M + T \quad \text{(Equation 5)}$$

wherein J is the moment of inertia of shaft 201 and M is the torque exerted by the alternator on shaft 201.

It is then possible to calculate the two coordinates N11, T11 of a second series of potential operating points based on equation 4. On FIG. 2, the operating points are positioned in function of their coordinate along N11 axis and of their coordinate along T11 axis. For the clarity of the graph, the potential operating points of the second series are represented by a curve C2 in full line. This second series of potential operating points is dynamic as it depends on the rotation speed N of the turbine and on the torque T exerted by water flow F on the runner 202. As a result, the second series of potential operating points is updated in function of the rotation speed N variation and/or of the torque T variation.

The second series includes the potential operating points of the turbine 20 at a certain rotation speed N of runner 202 and at a certain torque T exerted by water flow F on runner 202. In other words, one knows that at a determined rotation speed N and torque T, the operating point of turbine 20 is somewhere on the curve C2 joining the points of the second series.

Two coordinates of the real operating point of the turbine 20 can then be deduced by determining the point that belongs both to the first and to the second series. This real operating point is located at the intersection between the iso-opening curve C1 and the curve C2. N11_real denotes the coordinate of the real operating point along N11 axis and T11_real denotes the coordinate of the real operating point along T11 axis. In practice, the two coordinates N11_real and T11_real of the real operating point may be numerically interpolated. The real operating point is deduced in the considered operating range of the machine, that is in turbine mode in the example. On the basis of equation 1 or 2, the determination of the coordinates N11_real, T11_real of the real operating point allows calculating the net head H of the installation 2. This net head calculation is especially useful whenever a direct measure of the net head is not possible or not accurate. For example, net head calculation may be integrated in a loop control system aiming at stabilizing the net head of a hydraulic machine with S-characteristics. S-characteristics may be encountered during a pump-turbine start-up in turbine mode or with a Francis turbine under high water fall conditions.

The knowledge of N11_real and T11_real allows determining the third coordinate Q11_real by mean of an interpolation of the hillchart. The flow rate Q of water flow F passing through the turbine 20 maybe then calculated on the basis of the equation 3.

The calculation steps of the algorithm for determining the net head H and the flow rate Q are performed automatically by a non-represented electronic control unit that may be integrated in the turbine controller.

Some partial derivative associated to the quadruplet N11_real, Q11_real, T11_real, Y of the real operating point can further be calculated. For example, some partial derivative are $$\left.\frac{\partial N11}{\partial Q11}\right|_Y, \left.\frac{\partial N11}{\partial T11}\right|_{Q11}, \left.\frac{\partial T11}{\partial Q11}\right|_Y, \ldots$$

They are intrinsic to the operating point quadruplet of values and are used as input to determine control parameters for the turbine 20, such as the guide vanes orientation.

In a non-represented alternative embodiment of the invention, a similar method can be implemented to determine the operating point of a double-regulated turbine, such as a Kaplan turbine or a Bulb turbine. A double-regulated turbine includes a hub equipped with movable blades. The flow rate of water circulating around the hub is also regulated thanks to a series of guide vanes. In this case, the first series of potential operating points N'11, T'11 is determined for the orientation affected to the movable blades of the double-regulated turbine and for the opening affected to guide vanes. Using the above described method, the same calculation can be done to obtain the net head and the flow rate of water flowing through the double-regulated turbine.

In a non-represented alternative embodiment, the rotation of the shaft 201 is used to power a mechanical device. Installation 2 then converts hydraulic energy into mechanical energy.

In a non-represented alternative embodiment, the method can be implemented on a pump or a pump-turbine.

In a non-represented alternative embodiment, the operating range in which is determined the operating point corresponds to the pump mode.

The technical features of the different embodiments and alternative embodiments of the invention described hereabove can be combined together to generate new embodiments of the invention.

The invention claimed is:

1. A method for operating a hydraulic machine, the method comprising:
    generating an iso-opening curve of the hydraulic turbine at a given guide vane opening that defines at least two coordinates of a first series of operating points of the hydraulic machine;
    measuring a rotational speed of the hydraulic machine;
    determining a torque exerted by water flow on the hydraulic machine;

calculating at least two coordinates of a second series of operating points of the hydraulic machine as a function of the measured rotational speed and the torque;

generating a second-series curve of the hydraulic machine using the at least two coordinates of the second series of operating points of the hydraulic machine;

determining an intersection point of the iso-opening and second-series curves;

deducing two real coordinates of an operating point of the hydraulic machine from the intersection point; and adjusting, via an electronic control unit, a guide vane opening of the hydraulic machine based on the two real coordinates of the operating point.

2. The method of claim 1, further comprising:

calculating a net head subjected to the hydraulic machine as a function of the two real coordinates of the operating point and at least one of the rotational speed or the torque exerted by water flow.

3. The method of claim 1, further comprising:

calculating, on the basis of the two real coordinates of the operating point, a third coordinate of the operating point of the hydraulic machine.

4. The method of claim 3, further comprising:

calculating a flow rate of water passing through the hydraulic machine on the basis of the net head and of the third coordinate of the operating point.

5. The method of claim 3, further comprising:

calculating a partial derivative associated with the real coordinates of the operating point of the hydraulic machine.

6. The method of claim 5, wherein the real coordinates of the operating point of the hydraulic machine are deduced by interpolation.

7. The method of claim 1, wherein the hydraulic machine is a double-regulated turbine, comprising a hub equipped with movable blades, and wherein the two coordinates of the first series of operating points are determined for an orientation of the movable blades of the hydraulic machine.

8. A system for converting hydraulic energy into mechanical or electrical energy, comprising a hydraulic machine having at least one movable guide vane distributed around a runner, and an absence of pressure sensors operably coupled to hydraulic passage, and an electronic control unit integrated with a turbine controller, wherein the electronic control unit is configured to:

generate an iso-opening curve of the hydraulic turbine at a given guide vane opening that defines at least two coordinates of a first series of operating points of the hydraulic machine;

measure a rotational speed of the hydraulic machine;

determine a torque exerted by water flow on the hydraulic machine;

calculate at least two coordinates of a second series of operating points of the hydraulic machine as a function of the measured rotational speed and the torque;

generate a second-series curve of the hydraulic machine using the at least two coordinates of the second series of operating points of the hydraulic machine;

determine an intersection point of the iso-opening and second-series curves;

deduce two real coordinates of an operating point of the hydraulic machine from the intersection point; and adjust the at least one movable guide vane based on the two real coordinates of the operating point.

9. The system of claim 8, wherein the hydraulic machine is a Francis turbine.

10. The system of claim 8, wherein the hydraulic machine is a pump-turbine.

11. The system of claim 8, wherein the hydraulic machine is a double regulated turbine, comprising a hub equipped with movable blades, wherein the two coordinates of the first series of operating points are determined for an orientation of the movable blades of the hydraulic machine.

* * * * *